United States Patent
Dharanipathy et al.

(10) Patent No.: US 10,944,499 B2
(45) Date of Patent: Mar. 9, 2021

(54) WAVELENGTH DIVISION MULTIPLEXING DEVICE AND METHOD

(71) Applicant: Huawei Technologies Co., Ltd., Shenzhen (CN)

(72) Inventors: Ulagalandha Perumal Dharanipathy, Ghent (BE); Martijn Tassaert, Ghent (BE); Marco Lamponi, Ghent (BE); Dirk Taillaert, Ghent (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/698,776

(22) Filed: Nov. 27, 2019

(65) Prior Publication Data
US 2020/0099463 A1   Mar. 26, 2020

Related U.S. Application Data

(63) Continuation of application No. PCT/EP2017/062884, filed on May 29, 2017.

(51) Int. Cl.
*H04J 14/02* (2006.01)
*H04J 14/06* (2006.01)

(52) U.S. Cl.
CPC .......... *H04J 14/06* (2013.01); *H04J 14/0238* (2013.01)

(58) Field of Classification Search
CPC ..................................................... H04J 14/02
See application file for complete search history.

(56) References Cited

U.S. PATENT DOCUMENTS

| 5,809,184 A | 9/1998 | Doerr et al. |
| 7,171,129 B1 | 1/2007 | Blair et al. |

(Continued)

FOREIGN PATENT DOCUMENTS

| CN | 103782530 A | 5/2014 |
| CN | 104010233 A | 8/2014 |
| CN | 105071894 A | 11/2015 |
| CN | 106411452 A | 2/2017 |

OTHER PUBLICATIONS

Horst et al., "Cascaded Mach-Zehnder wavelength filters in silicon photonics for low loss and flat pass-band WDM (de-) multiplexing," Optics Express, vol. 21, No. 10, pp. 11652-11658, OSA (May 2013).

(Continued)

*Primary Examiner* — Shi K Li
(74) *Attorney, Agent, or Firm* — Leydig, Voit & Mayer, Ltd.

(57) ABSTRACT

The present disclosure provides a wavelength division multiplexing (WDM) device for demultiplexing an optical signal including a plurality of wavelength channels. The device comprises at least one demultiplexer block configured to provide, for each wavelength channel of the optical signal, two half-channel signals. The device further comprises a mode mapping block configured to map one half-channel signal related to a split wavelength channel into a first polarization mode, and the other half-channel signal related to the same split wavelength channel into a second polarization mode. The device also comprises an output block for each wavelength channel, each output block being configured to combine polarized half-channel signals related to the same wavelength channel.

14 Claims, 10 Drawing Sheets

(56) References Cited

U.S. PATENT DOCUMENTS

| | | |
|---|---|---|
| 9,134,479 B2 | 9/2015 | Assefa et al. |
| 2006/0147210 A1 | 7/2006 | Kim et al. |
| 2010/0322629 A1 | 12/2010 | Nagarajan et al. |
| 2011/0255869 A1 | 10/2011 | Rasras |
| 2013/0188971 A1 | 7/2013 | Painchaud |
| 2014/0064656 A1 | 3/2014 | Assefa et al. |
| 2014/0064729 A1 | 3/2014 | Assefa et al. |
| 2017/0279539 A1* | 9/2017 | Tanaka ............... G02B 6/126 |
| 2018/0143460 A1* | 5/2018 | Wen ................ G02B 6/2746 |

OTHER PUBLICATIONS

Luo et al., "High bandwidth on-chip silicon photonic interleaver," Optics Express, vol. 18, No. 22, pp. 23079-23087, OSA (Oct. 2010).

Okamoto, "Progress and technical challenge for planar waveguide devices: silica and silicon waveguides," Laser Photonics Rev. 6, No. 1, pp. 14-23, DOI 10.1002/lpor.201100003, total 10 pages (2012).

Gondarenko et al., "High Q Silicon Nitride Photonic Cavities," 2009 OSA/CLEO/IQEC, total 2 pages (2009).

Bauters et al., "Planar waveguides with less than 0.1 dB/m propagation loss fabricated with wafer bonding," Optics Express, pp. 24090-24101, Optical Society of America (Nov. 2011).

Chen et al., "Monolithically Integrated 40-Wavelength Demultiplexer and Photodetector Array on Silicon," IEEE Photonics Technology Letters, vol. 23, No. 13, pp. 869-871, Institute of Electrical and Electronics Engineers, New York, New York (Jul. 1, 2011).

Barwicz et al.,"Polarization-transparent microphotonic devices in the strong confinement limit," vol. 1, doi:10.1038/nphoton.2006.41, Nature Publishing Group (Dec. 21, 2006).

\* cited by examiner

WAVELENGTH DIVISION MULTIPLEXING
DEVICE AND METHOD

CROSS-REFERENCE TO RELATED
APPLICATIONS

This application is a continuation of International Application No. PCT/EP2017/062884, filed on May 29, 2017, the disclosure of which is hereby incorporated by reference in its entirety.

TECHNICAL FIELD

The present disclosure relates to a Wavelength Division Multiplexing (WDM) device for demultiplexing an optical signal, and to a corresponding method for demultiplexing an optical signal. The optical signal includes a plurality of wavelength channels, which are particularly multiplexed wavelength channels, that the device and method are adapted to demultiplex.

BACKGROUND

Silicon photonics is rapidly gaining importance as a generic technology platform for a wide range of applications, for instance, in telecom, datacom, interconnects, and sensing. It allows implementing photonic functions through the use of complementary metal-oxide-semiconductor (CMOS) compatible wafer-scale technologies on high quality, low cost silicon substrates.

Especially for short distance applications like datacom, interconnect, or access networks, device cost is a major concern. With silicon mass production, the price of a photonic chip integrating hundreds of basic building blocks can be extremely aggressive. However, due to the fact that silicon is an indirect band gap material, it is difficult to monolithically integrate active components. Therefore, conventional silicon devices need to be butt-coupled or flip-chipped (with expensive packaging), or the fabrication process has to be made much more complex.

Silicon nitride (SiN) based passive devices offer superior performance. For instance, propagation losses below 0.1 dB/cm have been demonstrated for waveguides with a 640 nm thick SiN core, and even below 0.1 dB/m for waveguides with a 50 nm thick SiN core. Also, the slightly lower refractive index contrast between SiN (n=2) and silicon dioxide (SiO$_2$) (n=1.45), compared to Si (n=3.5) and Sift (n=1.45), results in less phase noise and in larger fabrication tolerances. This makes the fabrication of high performance, but still very compact optical circuits, such as Arrayed Waveguide Gratings (AWGs), ring resonators, etc. possible.

WDM transceivers are an important application for silicon photonics technologies, as they enable transport of data with a relatively simple architecture and the same amount of optical fiber connections. In particular, the same fibers can carry all wavelengths together, thus increasing the capacity of data transport.

The scalability of networks demands optical transceiver devices with increasing bandwidths, but at very low cost. As mentioned above, with the silicon photonics technology, the price of a photonic chip integrating hundreds of basic building blocks can be extremely low. However, the total price of a transceiver also depends on a number of other factors, such as operating temperature, laser reliability etc.

Conventional transceivers normally comprise two parts, a Transmitter (TX) and a Receiver (RX). Inside the RX, a block that separates optical signals operating on different wavelengths is termed 'demultiplexer' or 'demultiplexer device'. Most often, such demultiplexer devices have very stringent specifications, in order to reduce the cost of the entire transceiver.

In lieu with the before-said reasons, it would be a huge advantage, if demultiplexer devices could work over an extended temperature range (for example, over a temperature range of 0-80° C.), without the need of any active or passive tuning mechanism (as, for example, embedded heaters). However, increases in temperature in standard semiconductor materials typically results in changes in the effective index, which in turn shifts the operating spectrum of a demultiplexer.

Thus, in order to accommodate larger temperature variations, the temperature induced wavelength shift window has to be taken into account. As a result, a much larger passband specification becomes necessary for the demultiplexer device, which is challenging to meet without a tuning mechanism.

On top of the aforementioned facts, the design of integrated optical elements on a single photonics chip comes with its limitations on operating bandwidth, as dispersion becomes a key factor in distorting the channel spacing and passband performance. Novel and intricately designed architectures are therefore necessary, in order to address all of these challenges.

Conventional approaches from the design point of view, for instance, implement device architectures that involve cascaded interferometers. These are capable of providing some of the flat passband characteristic that is required, and are realized, for example, as cascaded Mach Zehnder Interferometers (MZIs) or cascaded ring MZIs. However, the design of such devices becomes challenging for applications such as Coarse WDM (CWDM), when the total operating bandwidths gets close to 100 nm.

In particular, disadvantages appear in the insertion loss and channel uniformity of the different wavelength channels. As light has to go through the demultiplexer device comprising several individual components, each component introduces its own wavelength dependent spectral characteristic on the final spectrum achieved. The wavelength dependency of individual integrated photonic components over a 100 nm bandwidth can have a significant impact on the insertion loss and channel uniformity specifications of a demultiplexer device.

One often used architecture in the design of a conventional demultiplexer device is a polarization diversity architecture, which is shown in FIG. 9. The underlying reason to have this architecture, is to be able to have the demultiplexer device 900 work for any of transverse electric (TE)/transverse magnetic (TM) polarization inputs.

The device 900 is configured to receive an optical signal including a plurality of wavelength channels. An edge coupler block 901 and PSR (Polarization Splitter/Rotator) block 902 are used to separate and convert the different polarizations TE/TM of the input signal into one single polarization, which is then routed to two demultiplexer blocks 903a and 903b. The demultiplexer blocks 903a, 903b separate the wavelength channels multiplexed in the input signal, and route each wavelength channel to a photodiode (PD) 804.

The passband characteristic of the device 900 is fully determined by these demultiplexer blocks 903a, 903b, which perform the key functionality of the device 900. There are various design solutions known to design such a demultiplexer block 903a, 903b. The most widely used approaches, with their disadvantages, are listed in the below table.

| | |
|---|---|
| AWGs | Waveguide loss can be an issue, complete flat top is not possible |
| Cascaded MZI | Dependence on wavelength and coupler loss increases insertion loss. |
| Ring MZI | Dependence on coupling of rings and phase sections very critical |

Typical spectral characteristics of all three design options in the above table were carefully studied and simulated, and the results are shown for better understanding in FIGS. 10a and 10b.

FIGS. 10a and 10b clearly give an impression that the ring-assisted cascaded MZI should be the best design choice for achieving a flat passband characteristic. However, here the limits of practical implementations come into play. The major impediment in getting such blocks operational, depends on how well the coupling between the ring and interferometer is controlled. This inevitably leads to a situation in high index contrast platforms (such as Silicon On Insulator (SOI)) that one must use tuning mechanisms to get them operational. This unfortunately leads to a significant increase in device cost and complexity.

Medium index contrast platforms, however, can give enough contrast to achieve such blocks without an active control. However, this advantage comes with limitations on the ring radius that can be implemented. The larger the Free Spectral Range (FSR) is required to be (for example, CWDM applications require a considerably large FSR), the smaller the ring radius needs to be. Smaller ring radii, however, lead to increased losses, which impact on the overall performance of the demultiplexer devices. The losses, which are caused by the bends for various ring radii, are indicated in the below table.

| Ring Radius (um) | Typical bend loss medium index contrast platform (dB/cm) |
|---|---|
| 30 | $6*10^{-6}$ |
| 15 | 0.6 |
| 7.5 | 395 |

In conclusion, in high index contrast platforms, the conventional demultiplexer devices require tuning mechanisms, particularly if large temperature variations are taken into account. In medium index contrast platforms, a decrease in size of the conventional demultiplexer devices is not possible without increased losses.

SUMMARY

In view of the above-mentioned problems and disadvantages, embodiments of the present invention aim to improve the conventional demultiplexer devices and demultiplexing methods. In particular, a WDM device is provided for demultiplexing an optical signal including a plurality of wavelength channels.

Such demultiplexer device may have a flat passband characteristic, specifically has a more robust flat passband than a conventional demultiplexer device. In particular, the flat passband characteristic of the device should cover the largest part of the wavelength channel spacing. The device may work up to an operating bandwidth of >100 nm, including all wavelength dependence. The WDM device may achieve the above characteristics for larger temperature variations especially on medium refractive index contrast platforms like SiN—without the need for a tuning mechanism.

A first aspect of the present invention provides a WDM device for demultiplexing an optical signal including a plurality of wavelength channels, the device comprising at least one demultiplexer block configured to split the optical signal into two half-channel signals for each wavelength channel, a mode multiplexer block configured to map one half-channel signal related to a split wavelength channel into a first polarization mode, and the other half-channel signal related to the same split wavelength channel into a second polarization mode, and an output block for each wavelength channel, which is configured to combine all polarized half-channel signals related to the same wavelength channel.

The WDM device of the first aspect has a very flat passband characteristic, particularly one that covers up to 90% of the wavelength channel spacing. For example, in the case of CWDM, the flat passband of the device covers 17 nm out of 20 nm wavelength channel spacing. The WDM device can further operate up to an operating bandwidth of >100 nm, including all wavelength dependence, and thereby requires no tuning mechanism for temperature variations of up to 80° C. (even if fabricated in a medium refractive index platform like SiN).

These device characteristics are achieved by the splitting of the wavelength channels into half-channel signals, mapping these half-channel signals into different polarization modes, and finally combing them in the output block to reconstruct the wavelength channels. Each wavelength channel in the optical signal can be defined by a center wavelength and a certain spectral width around that center wavelength. Further, the center wavelengths of adjacent wavelength channels are spectrally separated by a certain channel spacing. Splitting a wavelength channel into two half-channel signals means halving the spectral width of the wavelength channel. Accordingly, each half-channel signal may be defined by a new spectral width that is half the spectral width of the corresponding wavelength channel, and a new center wavelength of this new spectral width.

The WDM device is finally capable to implement mode multiplexing and polarization diversity, as shown below.

The increased passband flatness of the WDM device of the first aspect is extremely helpful for applications involving a high volume of devices, since this additional bandwidth will significantly increase yield numbers and thus also drive down the cost of the device. The WDM device of the first aspect also allows incorporating a wide range of temperature operations, resulting in a significant process margin for the components involved, for instance for transmitter components such as low cost lasers.

In an implementation form of the first aspect, the WDM device further comprises a PSR block configured to provide the optical signal with a uniform polarization, and to provide the uniform-polarization optical signal to the at least one demultiplexer block.

In a further implementation form of the first aspect, the WDM comprises two demultiplexer blocks, wherein the PSR block is configured to separate the optical signal into a first-polarization optical signal and a second-polarization optical signal, provide the first-polarization optical signal to the first demultiplexer block, and convert the second-polarization optical signal to a first-polarization optical signal and provide it to the second demultiplexer block.

The PSR block of the above implementation forms provides the WDM device with polarization diversity. Thus, any, for instance, TE and TM, polarizations can be input into the WDM device.

In a further implementation form of the first aspect, the first-polarization optical signal has a TE polarization, and/or the second-polarization optical signal has a TM polarization.

In a further implementation form of the first aspect, the output block comprises a multimode-input waveguide photodiode, and the mode multiplexer block is configured to provide polarized half-channel signals related to the same split wavelength channel on separate waveguides to the output block.

This implementation form enables a very high speed operation of the WDM device, and several integration advantages.

In a further implementation form of the first aspect, the output block comprises a combination grating and a surface-entry photodiode, and the mode multiplexer block is configured to provide polarized half-channel signals related to the same split wavelength channel on a common waveguide to the output block.

This implementation form achieves an improved final result, in particular a more robust flat passband characteristic of the WDM device.

In a further implementation form of the first aspect, an aperture of each surface-entry photodiode is between 16-20 μm, and is, in particular, 18 μm.

With these dimensions, coupling into the surface-entry photodiode with very low polarization dependent loss is obtained. The dimensions are within the limits of current manufacturing processes.

In a further implementation form of the first aspect, the mode multiplexer block comprises a PSR-based device, which is configured to receive the one half-channel signal on a first arm and keep it in the first polarization mode, and to receive the other half-channel signal on a second arm and keep it in the second polarization mode.

With such a PSR-based device, the mapping of the half-channel signals into the different modes can be very precise, thus improving the flat passband characteristic.

In a further implementation form of the first aspect, the first polarization mode is a fundamental mode (T0) and/or the second polarization mode is a first order mode (T1).

In a further implementation form of the first aspect, the optical signal includes four multiplexed wavelength channels, and the at least one demultiplexer block is configured to split the optical signal into eight half-channel signals.

In a further implementation form of the first aspect, a wavelength channel spacing is 20 nm, and/or a half-channel signal spacing is 10 nm.

In a further implementation form of the first aspect, the at least one demultiplexer block comprises a cascaded MZI and/or a ring-assisted MZI.

The use of such blocks provides the best flat passband characteristic to the WDM device. In particular, such blocks achieve steep filter wall slope, and thus ideal filter characteristics.

In a further implementation form of the first aspect, the WDM device further comprises an edge-coupler block configured to couple the optical signal into the WDM device.

The edge coupler block enables low loss coupling of light into the WDM device. The edge coupler block is, for instance, realized by the so called trident coupler.

A second aspect of the present invention provides a method for demultiplexing an optical signal including a plurality of wavelength channels. The method comprises splitting the optical signal into two half-channel signals for each wavelength channel, mapping one half-channel signal related to a split wavelength channel into a first polarization mode, and the other half-channel signal related to the same split wavelength channel into a second polarization mode, and combining, for each wavelength channel, all polarized half-channel signals related to the same wavelength channel.

In an implementation form of the first aspect, the method further comprises providing the optical signal with a uniform polarization, and providing the uniform-polarization optical signal to the at least one demultiplexer block.

In a further implementation form of the first aspect, the method comprises separating the optical signal into a first-polarization optical signal and a second-polarization optical signal, providing the first-polarization optical signal to a first demultiplexer block, and converting the second-polarization optical signal to a first-polarization optical signal and providing it to a second demultiplexer block.

In a further implementation form of the first aspect, the first-polarization optical signal has a TE polarization, and/or the second-polarization optical signal has a TM polarization.

In a further implementation form of the first aspect, the method comprises providing polarized half-channel signals related to the same split wavelength channel on separate waveguides to the output block.

In a further implementation form of the first aspect, the method comprises providing polarized half-channel signals related to the same split wavelength channel on a common waveguide to the output block.

In a further implementation form of the first aspect, the method further comprises receiving the one half-channel signal on a first arm of a PSR-based device and keeping it in the first polarization mode, and receiving the other half-channel signal on a second arm of the PSR-based device and keeping it in the second polarization mode.

In a further implementation form of the first aspect, the first polarization mode is a fundamental mode (T0), and/or the second polarization mode is a first order mode (T1).

In a further implementation form of the first aspect, the optical signal includes four multiplexed wavelength channels, and the method comprises splitting the optical signal into eight half-channel signals.

In a further implementation form of the first aspect, a wavelength channel spacing is 20 nm, and/or a half-channel signal spacing is 10 nm.

The method of the second aspect and its implementation forms achieve all the advantages described above for the WDM device of the first aspect and its respective implementation forms.

It is to be noted that all devices, elements, units and means described in the present application could be implemented by various hardware elements or combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DETAILED DESCRIPTION OF EMBODIMENTS

Figure 1:
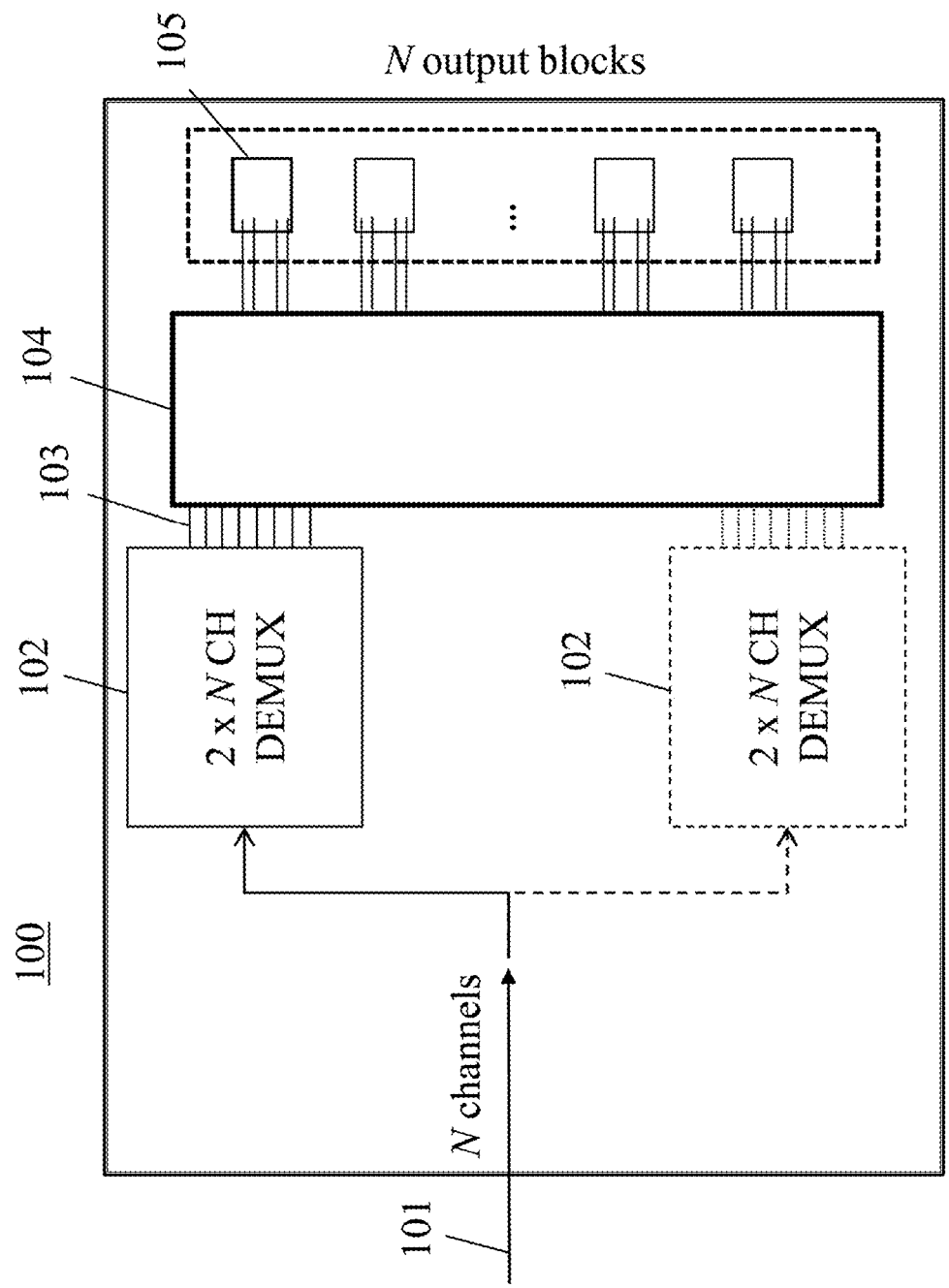
FIG. 1 shows a WDM device according to an embodiment of the present invention.

FIG. 1 shows a WDM device 100 according to an embodiment of the present invention. The WDM device 100 is configured to demultiplex an optical signal 101 including a plurality of N wavelength channels (N being a natural number). The device 100 comprises at least one demultiplexer block 102 (FIG. 1 already indicates with a dashed line that more than one demultiplexer block 102 may be included in the device, which will be described in more detail with respect to FIG. 3), a mode mapping block 104, and an output block 105 for each of the N wavelength channels, i.e. it comprises N output blocks 105.

The at least one demultiplexer block 102 (i.e. each demultiplexer block 102 in the WDM device 100) is configured to split the optical signal 101 into two half-channel signals 103 for each wavelength channel. That is, it is configured to output 2N half-channel signals 103 to the mode mapping block 104.

The mode mapping block 104 is configured to map one half-channel signal 103 related to a split wavelength channel into a first polarization mode, and the other half-channel signal 103 related to the same split wavelength channel into a second polarization mode. It is particularly configured to perform this mapping for the half-channel signals related to each wavelength channel (as received from one demultiplexer block 102). The block 104 is further configured to output the corresponding polarized half-channel signals to the output blocks 105.

Each of the N output blocks 105 is configured to combine all polarized half-channel signals related to the same wavelength channel. In case that the WDM device 100 includes one demultiplexer block 102, each output block 105 has to combine two polarized half-channel signals to reconstruct the related wavelength channel. If the WDM device 100 includes 2 demultiplexer blocks 102, each output block 105 has to combine four polarized half-channel signals (two from each demultiplexer block 102) to reconstruct the related wavelength channel. If the WDM device 100 includes M demultiplexer blocks 102 (M being a natural number), each output block 105 has to combine 2M polarized half-channel signals (two from each demultiplexer block 102) to reconstruct the related wavelength channel.

Figure 2:
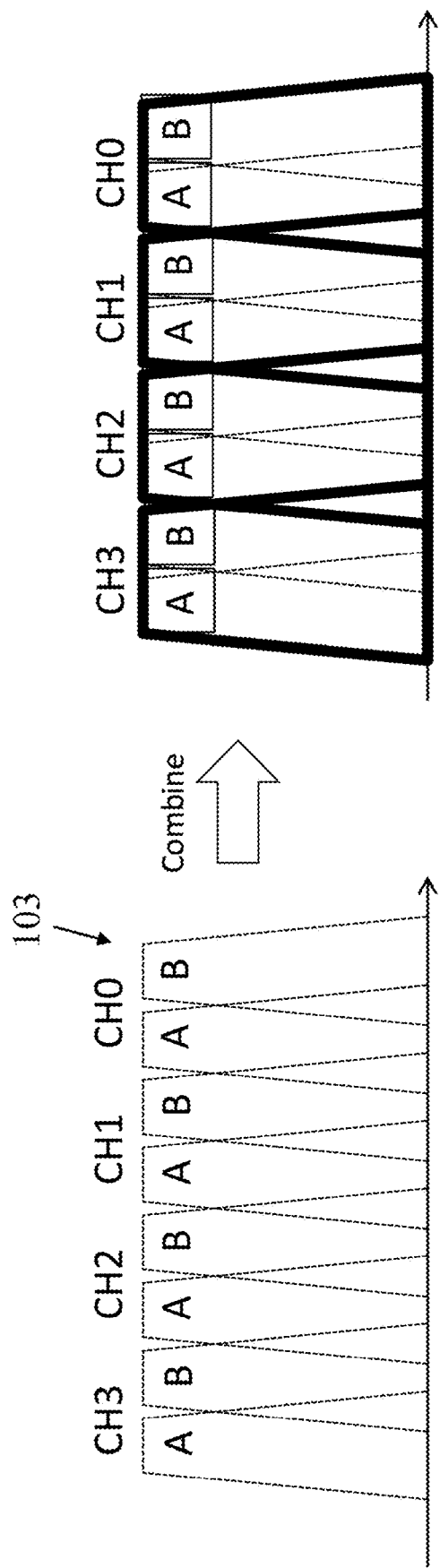
FIG. 2 shows a combination of half-channel signals related to the same wavelength channel.
Figure 3:
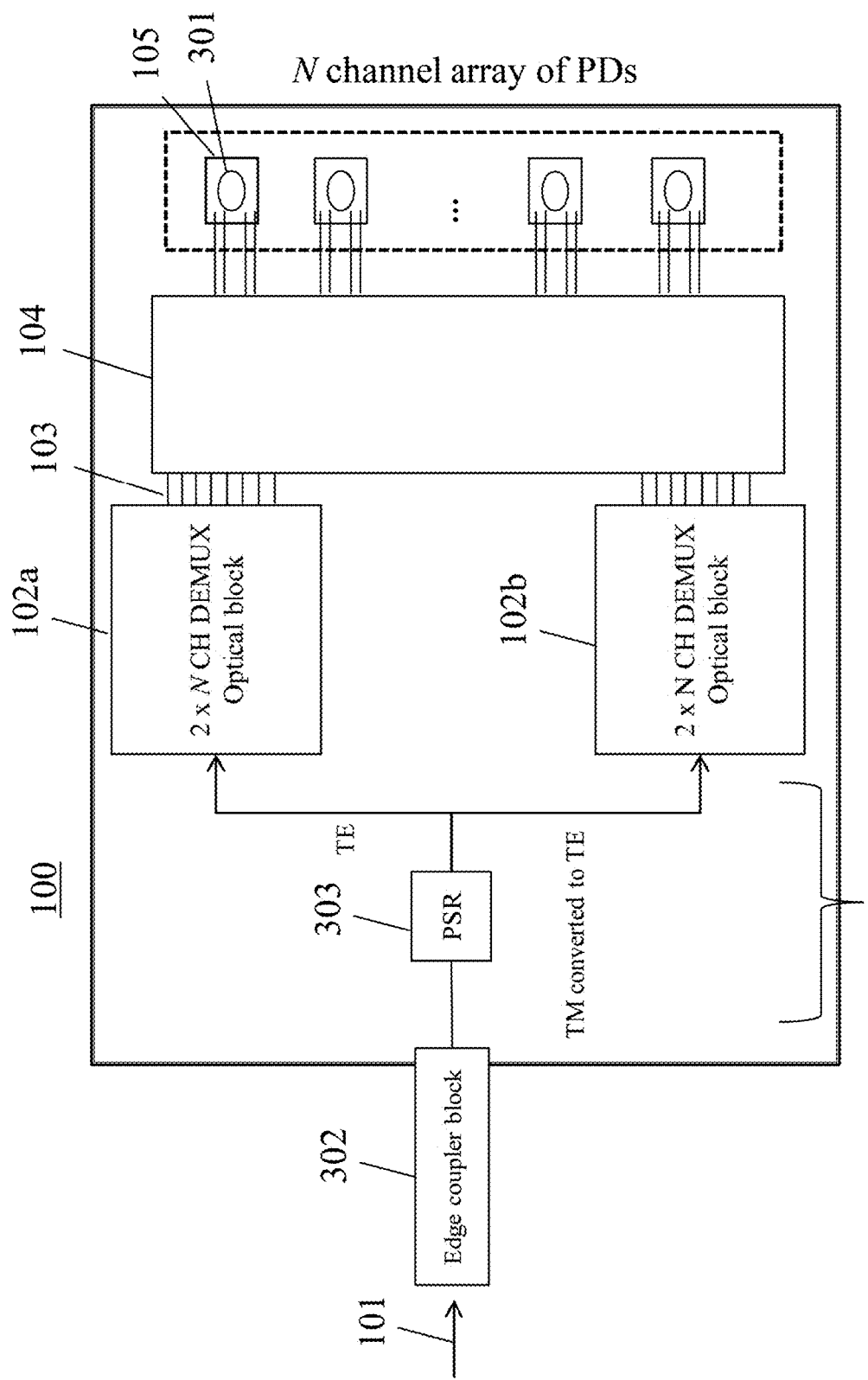
FIG. 3 shows a WDM device according to an embodiment of the present invention.

Thus, in the WDM device 100, each wavelength channel that is multiplexed into the optical input signal 101 is split into two half-channel signals 103 in each demultiplexer block 102. Related adjacent half-channel signals are shown in FIG. 2, and are labelled as 'A' and 'B" (see left hand side). These adjacent half-channel signals 103 are combined using an output block 105, wherein the output block 105 may be a photodiode 301 as shown in FIG. 3. The combining reconstructs again the original wavelength channel, as is indicated in FIG. 2 (right hand side) by the thick black colored lines.

The WDM device 100 may specifically include, for a 4-channel situation, i.e. for an optical signal 101 including N=4 wavelength channels, at least one 8-channel demultiplexer block 102, particularly with a 10 nm half-channel signal spacing. However, the WDM device 100 can also be extended to a generic N-channel scenario, where the same logic continues to apply. That is, 2N-channel demultiplexer blocks 102 are arranged to split the N wavelength channels into 2N half-channels 103.

Figure 4:
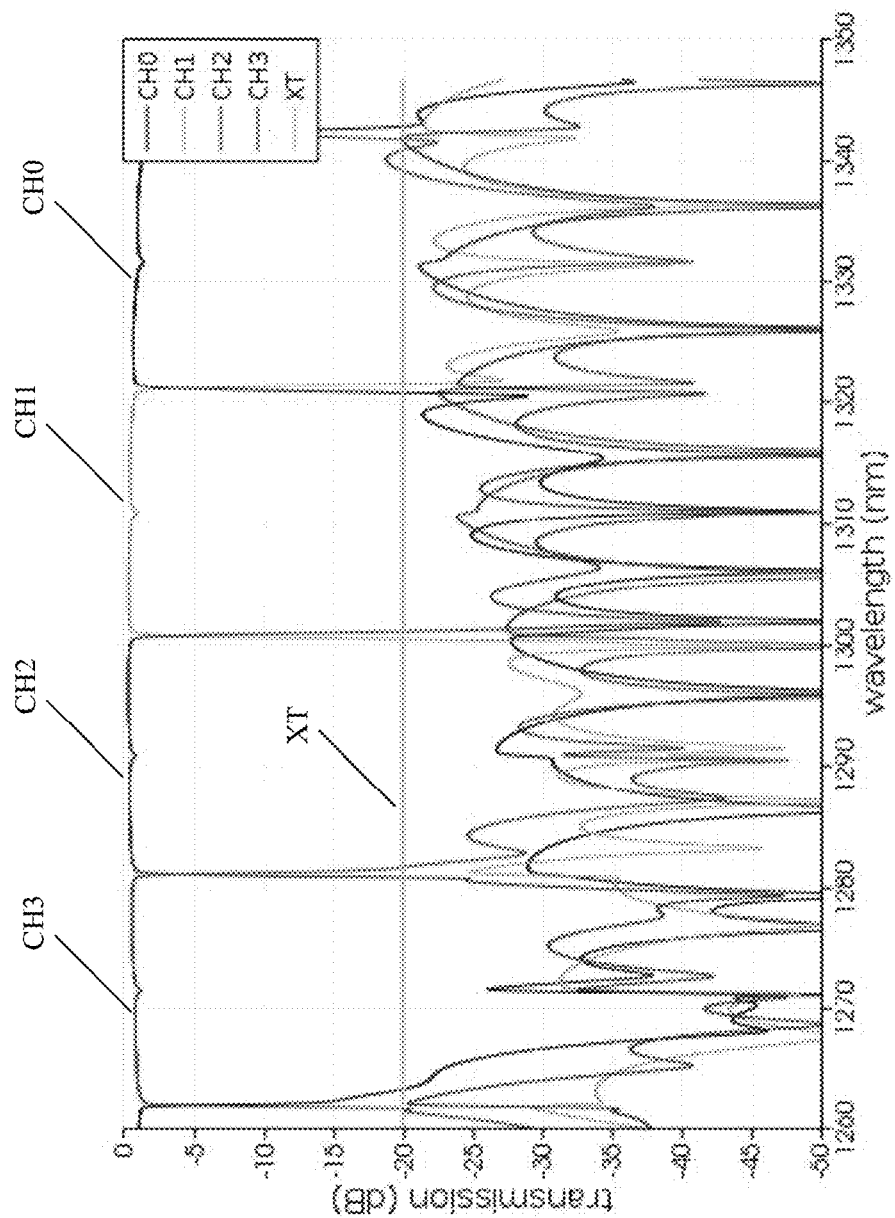
FIG. 4 shows simulation results for the WDM device shown in FIG. 3.
Figure 5:
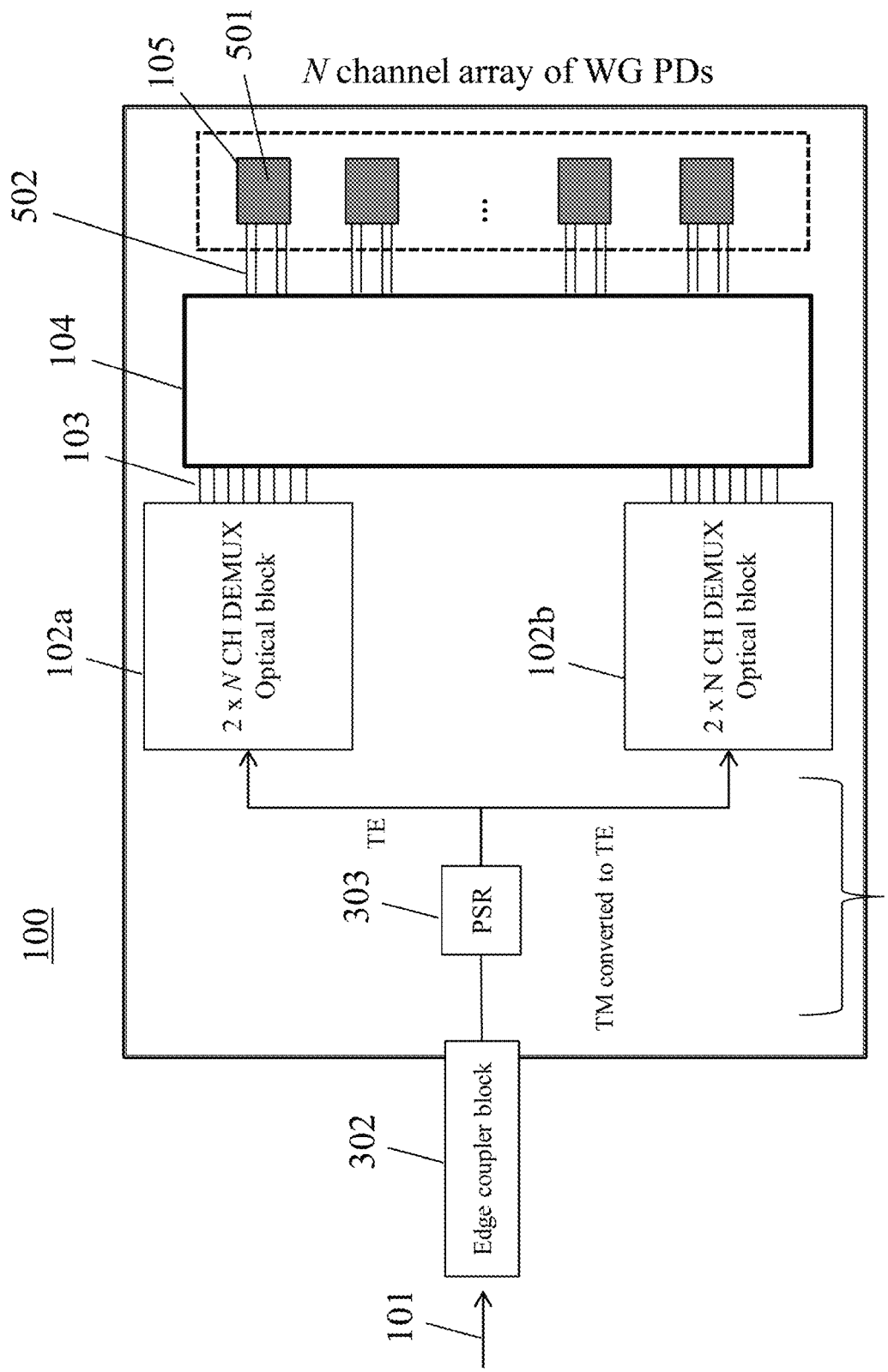
FIG. 5 shows a WDM device according to an embodiment of the present invention.

Different implementations forms for the design of the WDM device 100 of FIG. 1 are described below. FIG. 3 thereby shows a more general implementation form, with respect to particularly the output blocks 105, and the FIGS. 4 and 5 show, respectively, more specific implementation forms based on different output blocks 105.

FIG. 3 shows a device 100 according to an embodiment of present invention. The device 100 builds on the device 100 shown in FIG. 1, in that it includes two demultiplexer blocks 102a, 102b, a mode mapping block 104, and a plurality of N output blocks 105.

The device 100 further preferably comprises an edge coupler block 302, which is configured to couple light (the optical signal 101 including the plurality of N wavelength channels) into the WDM device 100. The edge coupler block 302 is preferably followed by a PSR block 303, which is configured to provide the optical input signal 101 with a uniform polarization. In particular, it is configured to separate the optical signal 101 into a first-polarization optical signal and a second-polarization optical signal, and to convert the second-polarization optical signal to a first-polarization optical signal. Then, it is configured to output these two first-polarization optical signals on two arms to the two demultiplexer blocks 102a and 102b, respectively. In FIG. 3, specifically a TM polarized signal is converted to a TE polarized signal, and two TE polarized optical signals are provided to the two demultiplexer blocks 102a, 102b. In other words, the first-polarization optical signal has a TE polarization, and the second-polarization optical signal has a TM polarization. Thus, polarization demultiplexing is carried out in the WDM device 100, in order to achieve polarization diversity.

The two 2N-channel demultiplexer blocks 102a, 102b follow connected to the two arms, respectively, and operate as described with respect to the device 100 shown in FIG. 1. In order to achieve the steepest filter wall slope, a ring-assisted MZI architecture may be deployed in these demultiplexer blocks 102a, 102b. This architecture achieves the most ideal filter characteristics.

The mapping of the half-channel signals 103 output from a certain demultiplexer block 102a or 102b into different polarization modes is then carried out by the mode mapping block 104, as described with respect to the device 100 of FIG. 1. In particular, the two polarization modes are a fundamental polarization mode TE0 and a first-order polarization mode TE1, respectively.

The output blocks 105 follow the mode mapping block 104, and are realized in FIG. 3 as PDs 301. That is, the WDM device 100 comprises an N-channel array of PDS, each for reconstructing one of the N optical wavelength channels, and converting it into an electrical signal. The output blocks 105, specifically PDs 301, can be implemented differently as described further below.

FIG. 4 shows simulation results for the device 100 shown in FIG. 3. In particular, transmission (dB) is plotted vs. wavelength (nm). The wavelength dependent transmission characteristic is particularly shown for four wavelength channels CH0-CH3. Here, an O-band CWDM-ITU spec (with center wavelengths 1271 nm, 1291 nm, 1311 nm, and 1331 nm for CH0-CH3, respectively) was investigated. It can be seen that a very nice flat passband is obtained for each wavelength channel. Specifically, a flat passband of around 17 nm can be observed for a channel spacing of 20 nm. This passband characteristic is sufficient to cover a temperature variation (assuming SiN platform) of up to 80° C. without the need of any tuning or thermoelectric cooling (TEC) device.

FIG. 5 shows a WDM device 100 according to an embodiment of the present invention, which builds on the device 100 shown in FIG. 3. In the device 100 of FIG. 5, the light (polarized half-channel signals) from the mode mapping block 104 is directly coupled into output blocks 105 each comprising a waveguide photodiode (WG PD) 501. That is, the device 100 preferably comprises an N-channel array of WG PDs 501. In this coupling scheme, the mode mapping block 104 is configured to provide the polarized half-channel signals related to the same split wavelength channel on separate waveguides 502 to one of the output blocks 105. This coupling scheme of FIG. 5 enables a very high speed operation, and more integration advantages when compared to the device 100 shown in FIG. 6.

Figure 6:
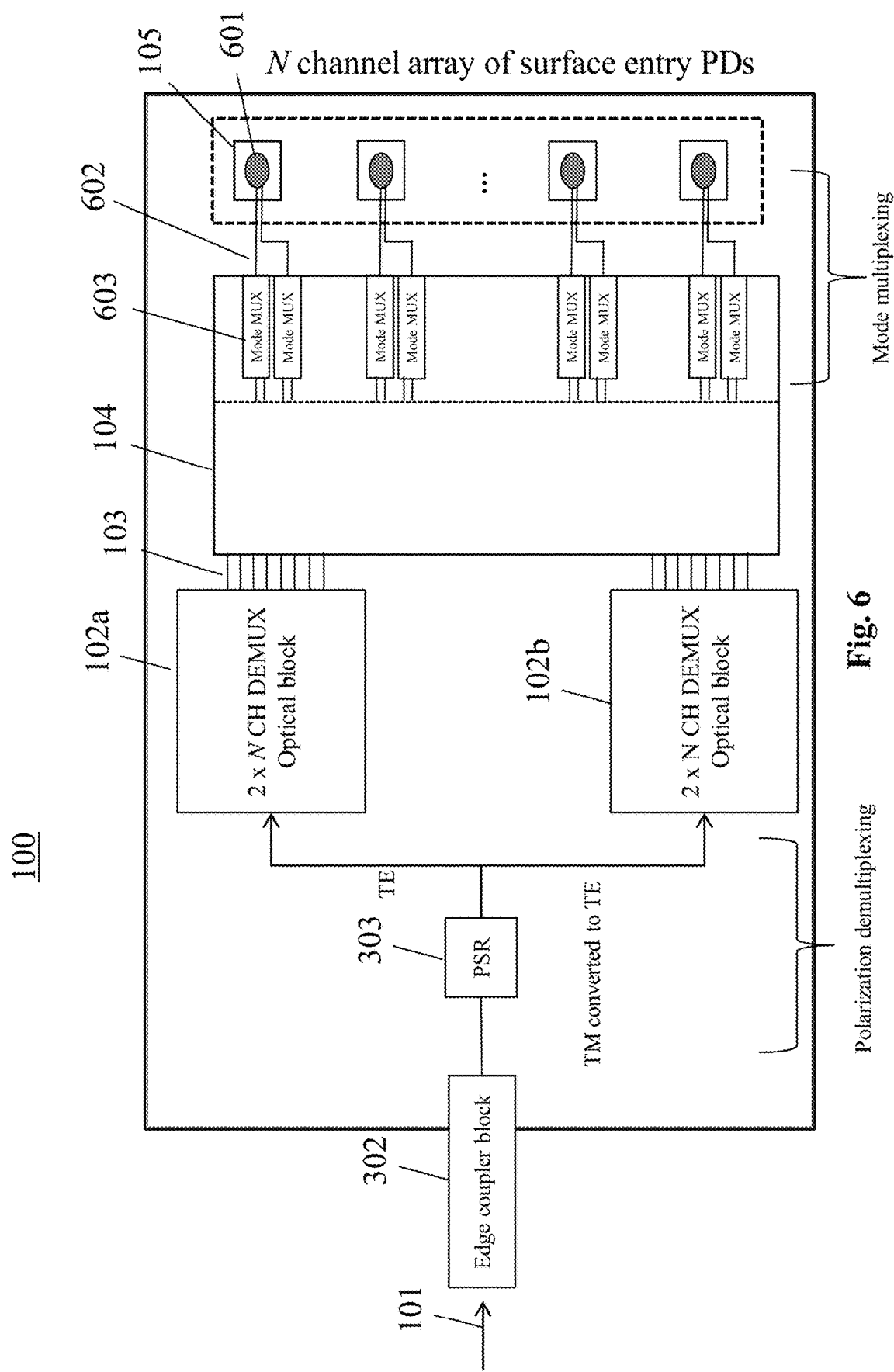
FIG. 6 shows a WDM device according to an embodiment of the present invention.

FIG. 6 shows a WDM device 100 according to an embodiment of the present invention, which builds on the device 100 shown in FIG. 3. In the device 100 of FIG. 6, the light (polarized half-channel signals) from the mode mapping block 104 is coupled into a combination grating 701 (in FIG. 7) that in turn couples the light into output blocks 105 each comprising a surface entry PD 601. That is, the device 100 preferably comprises an N-channel array of surface entry PDs 601. In this coupling scheme, the mode mapping block 104 is configured to provide polarized half-channel signals related to the same split wavelength channel multiplexed on a common waveguide 602 to one of the output blocks 105. This is achieved with a plurality of mode multiplexer blocks 603 in the mode mapping block 104 (alternatively, these can also be separated blocks 603 connected to the mode mapping block 104), wherein each mode multiplexer block 603 is configured to multiplex the two polarized half-channel signals related to the same wavelength channel (from one of the demultiplexer blocks 102) to the common waveguide 602. The device 100 accordingly implements mode multiplexing.

The aperture of the PDs is an important factor in determining how much light from both polarizations can enter the PD. Particularly for the exemplary case of a 4-channel CWDM situation, a PD aperture of 18 um with an alignment tolerance of +/−2 um is selected, in order to obtain equivalent low loss coupling with a very low PDL. This coupling scheme of FIG. 6 provides the WDM device 100 with improved flat passband characteristic.

Figure 7:
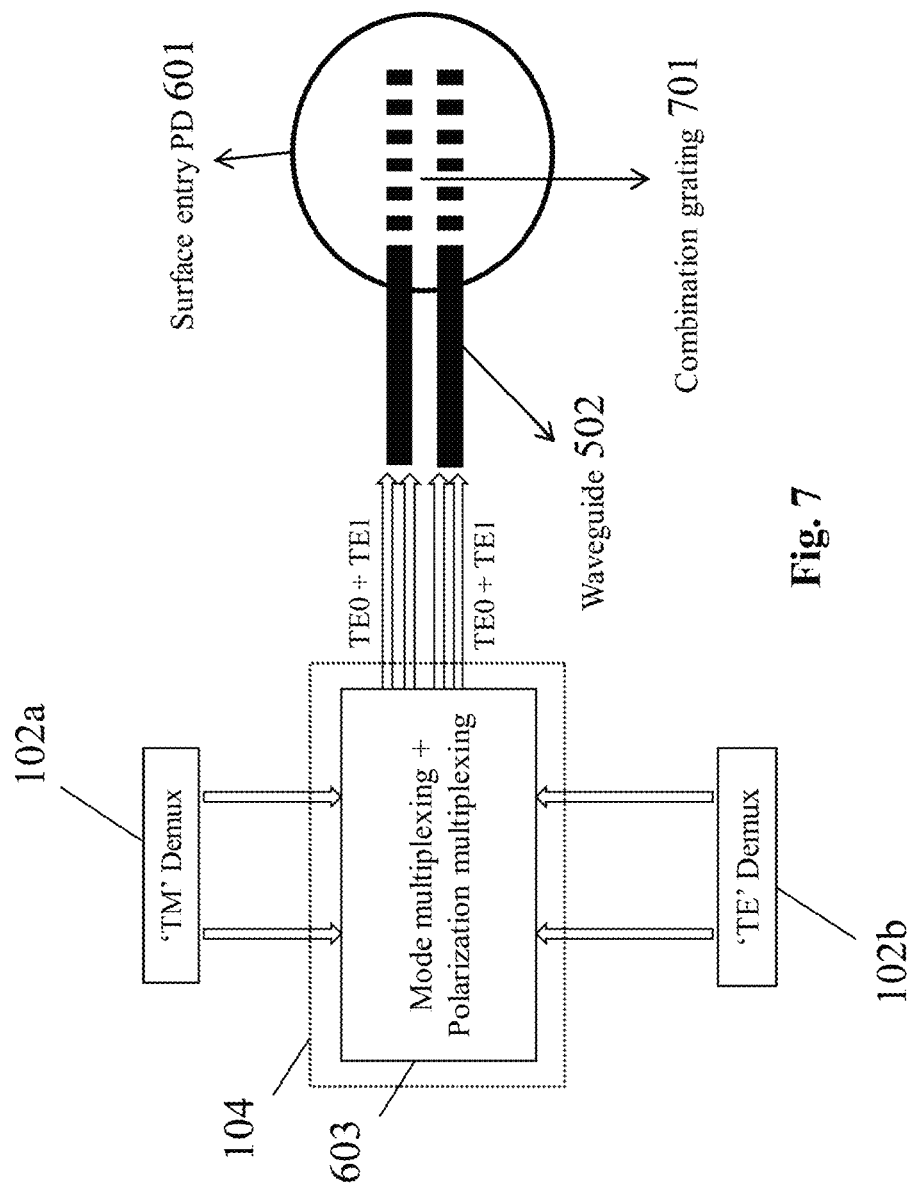
FIG. 7 shows a detail of the WDM device shown in FIG. 5.

The practical implementation of the coupling scheme of FIG. 6 is shown in FIG. 7. Each of the two demultiplexer blocks 102a ('TM' demultiplexer block) and 102b ('TE' demultiplexer block) provides two polarized half-channel signals per wavelength channel (e.g. with polarizations TE0 and TE1, respectively) to the mode mapping block 104 including mode multiplexer blocks 603. Each mode multiplexer block 603 is configured to receive two polarized half-channel signals related to one wavelength channel. Each mode multiplexer block 603 is called "Half PSR", and has two input arms. In one input arm, the block 603 takes one half-channel signal and keeps it, for instance, in the TE0 polarization state. In the other input arm, the block 603 takes the other polarized half-channel signal, and keeps it, for instance, in the TE1 polarization state. It then outputs a single output to a common waveguide 502, which carries both the polarization states TE0+TE1. The mode mapping block 104 including the mode multiplexers is thus in total configured to receive two half-channel signals, and to map the two half-channel signals to a first polarization mode signal multiplexed with a second polarization mode signal.

Figure 8:
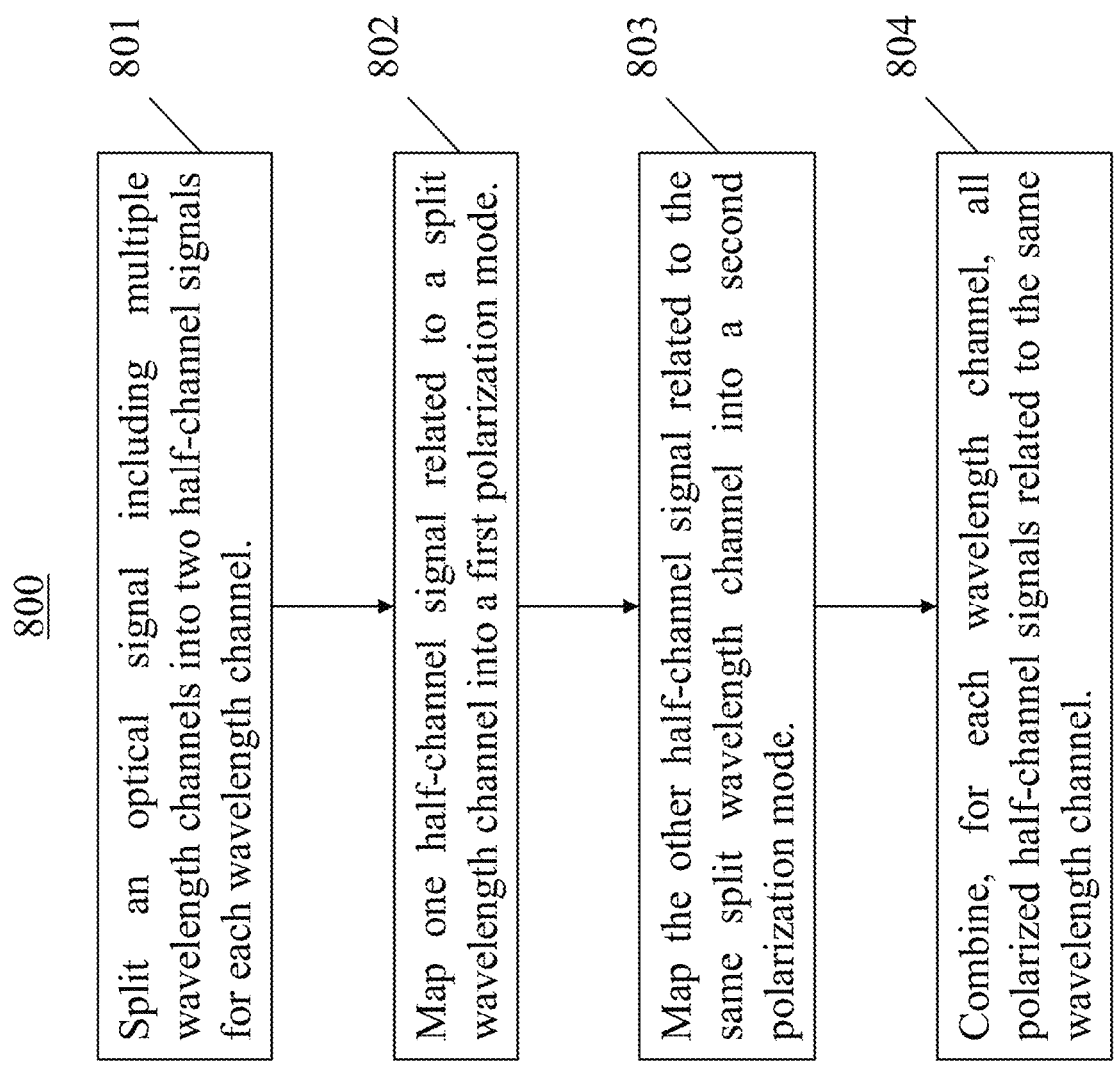
FIG. 8 shows a method according to an embodiment of the present invention.
Figure 9:
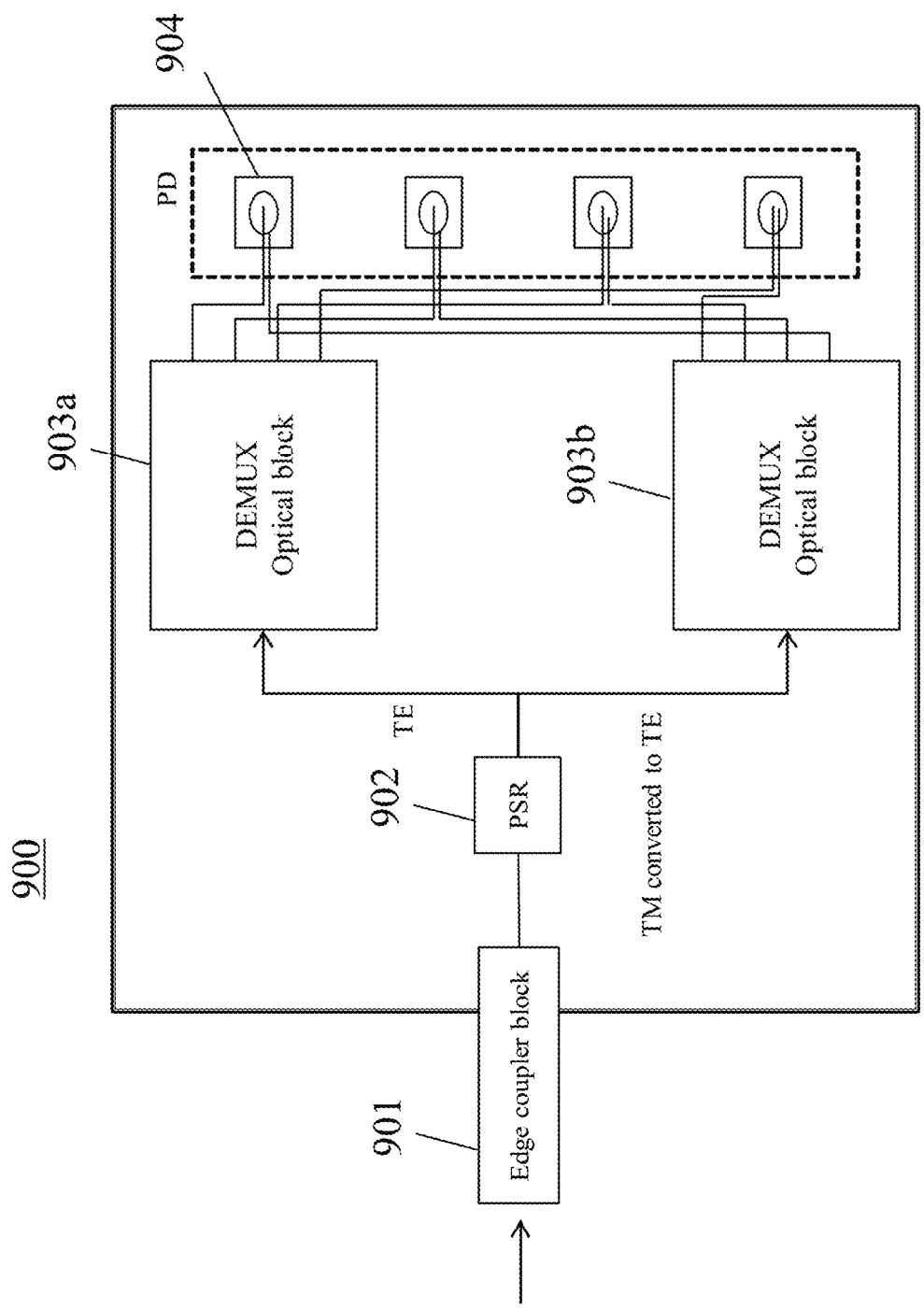
FIG. 9 shows a conventional WDM device.
Figure 10B:
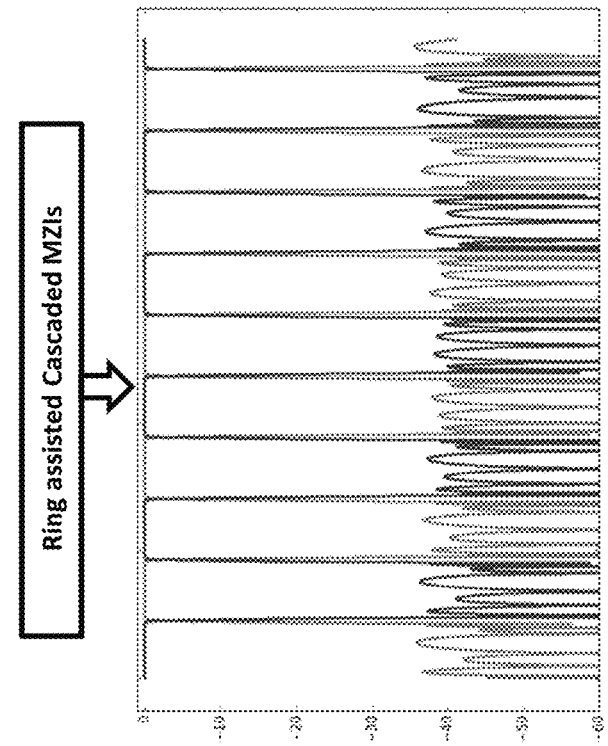
FIGS. 10(a) and 10(b) show simulated spectral characteristics of AWGs, cascaded MZIs, and ring-assisted cascaded MZIs.
Figure 10A:
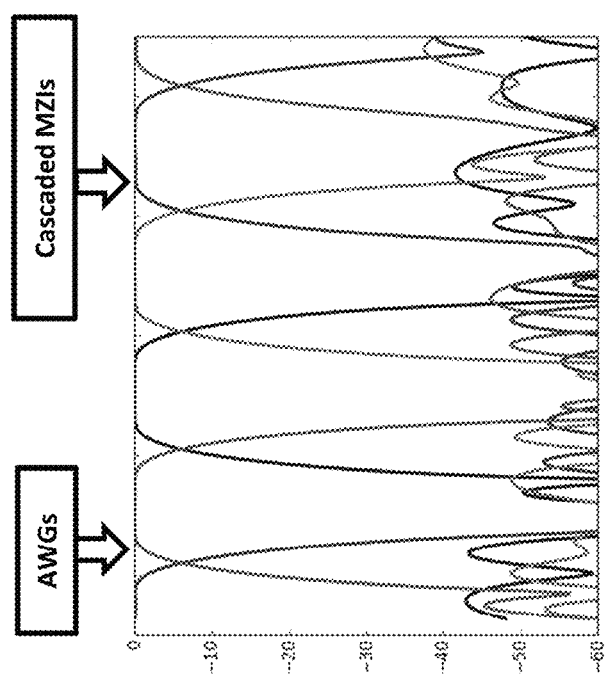

FIG. 8 shows a method 800 for demultiplexing an optical signal 101 including a plurality of N wavelength channels. The method 800 corresponds to the device 100 shown in FIG. 1. In particular, the method 800 may be carried out by the device 100 of FIG. 1. The method 800 specifically comprises a step 801 of splitting the optical signal 101 into two half-channel signals 103 for each wavelength channel. This step 801 may be carried out by a demultiplexer block 102 of the WDM device 100. The method 800 also comprises a step 802 of mapping one half-channel signal 103 related to a split wavelength channel into a first polarization mode, and the other half-channel signal 103 related to the same split wavelength channel into a second polarization mode. This step 802 may be carried out in the mode mapping block 104 of the WDM device 100. Finally, the method 800 comprises a step 804 of combining, for each wavelength channel, all polarized half-channel signals related to the same wavelength channel. This may be done, for each wavelength channel, in an output block 105 of the WDM device 100.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A wavelength division multiplexing (WDM) device for demultiplexing an optical signal including a plurality of wavelength channels, each respective wavelength channel having a corresponding respective channel bandwidth, the device comprising:
    a demultiplexer block configured to split each respective wavelength channel of the optical signal into a first half-channel signal including half of the corresponding respective channel bandwidth and a second half channel signal including the other half of the corresponding respective channel bandwidth;

a mode mapping block configured to map each first half-channel signal into a first polarization mode and each second half-channel signal into a second polarization mode, and an output block for each respective wavelength channel, each output block being configured to combine a first polarized half-channel signal that corresponds to the respective wavelength channel and a second polarized half channel signal that corresponds to the respective wavelength channel.

2. The WDM device according to claim 1, further comprising:

a polarization splitter/rotator (PSR) block configured to provide the optical signal with a uniform polarization, and to provide the uniform-polarization optical signal to the demultiplexer block.

3. The WDM device according to claim 2, wherein the demultiplexer block includes a first demultiplexer and a second demultiplexer, and wherein the PSR block is configured to:

separate the optical signal into a first polarized optical signal having a first polarization and a second polarized optical signal having a second polarization, provide the first polarized optical signal to the first demultiplexer, and convert the second polarized optical signal to a converted polarized optical signal having the first polarization and provide the converted polarized optical signal to the second demultiplexer.

4. The WDM device according to claim 3, wherein the first polarization is a transverse electric (TE) polarization, and/or the second polarization is a transverse magnetic (TM), polarization.

5. The WDM device according to claim 1, wherein each output block comprises a multimode-input waveguide photodiode, and wherein the mode mapping block is configured to provide, for each respective wavelength channel, a respective first half-channel signal and a respective second half channel signal on separate waveguides to the output block.

6. The WDM device according to claim 1, wherein the output block comprises a combination grating and a surface-entry photodiode, and wherein the mode mapping block is configured to provide, for each respective wavelength channel, a respective first half-channel signal and a respective second half channel signal multiplexed on a common waveguide to the output block.

7. The WDM device according to claim 6, wherein an aperture of each surface-entry photodiode is between 16-20 µm.

8. The WDM device according to claim 1, wherein the mode mapping block comprises a polarization splitter/rotator (PSR)-based device configured to receive a respective first half-channel signal on a first arm and keep it in the first polarization mode, and to receive a corresponding respective second half-channel signal on a second arm and keep it in the second polarization mode.

9. The WDM device according to claim 1, wherein the first polarization mode is a fundamental mode (T0) and/or the second polarization mode is a first order mode (T1).

10. The WDM device according to claim 1, wherein the optical signal includes four multiplexed wavelength channels, and wherein the demultiplexer block is configured to split the optical signal into eight half-channel signals.

11. The WDM device according to claim 1, wherein a wavelength channel spacing is 20 nm, and/or a half-channel signal spacing is 10 nm.

12. The WDM device according to claim 1, wherein the first demultiplexer block comprises a cascaded Mach-Zehnder-interferometer (MZI) and/or a ring-assisted MZI.

13. The WDM device according to claim 1, further comprising an edge-coupler block configured to couple the optical signal into the WDM device.

14. A method for demultiplexing an optical signal including a plurality of wavelength channels, each respective wavelength channel having a corresponding respective channel bandwidth, the method comprising:

splitting the optical signal into, for each respective wavelength channel, a first half-channel signal including half of the corresponding respective channel bandwidth and a second half channel signal including half of the corresponding respective channel bandwidth, mapping each first half-channel signal into a first polarization mode, and each second half-channel signal into a second polarization mode, and combining, for each respective wavelength channel, the first polarized half-channel signal corresponding to the respective wavelength channel and the second polarized half-channel signal related to the respective wavelength channel.

* * * * *

UNITED STATES PATENT AND TRADEMARK OFFICE
CERTIFICATE OF CORRECTION

| | | |
|---|---|---|
| PATENT NO. | : 10,944,499 B2 | Page 1 of 1 |
| APPLICATION NO. | : 16/698776 | |
| DATED | : March 9, 2021 | |
| INVENTOR(S) | : Dharanipathy et al. | |

It is certified that error appears in the above-identified patent and that said Letters Patent is hereby corrected as shown below:

On the Title Page

Page 2: Other Publications, Line 12, Citation 5: "IEEE Phototonics" should read -- IEEE Photonics --.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*